United States Patent
Brailean et al.

(10) Patent No.: US 6,327,307 B1
(45) Date of Patent: *Dec. 4, 2001

(54) DEVICE, ARTICLE OF MANUFACTURE, METHOD, MEMORY, AND COMPUTER-READABLE MEMORY FOR REMOVING VIDEO CODING ERRORS

(75) Inventors: James C. Brailean, Aurora; David D. Nicozisin, Schaumburg, both of IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/131,143

(22) Filed: Aug. 7, 1998

(51) Int. Cl.[7] ..................................................... H04N 7/12
(52) U.S. Cl. ...................... 375/240.29; 348/607; 382/275
(58) Field of Search ................... 375/240.24, 240.25, 375/240.27, 240.29; 348/420.1, 425.2, 606–607, 625; 382/233, 252, 260–266, 275

(56) References Cited

U.S. PATENT DOCUMENTS

| | | | |
|---|---|---|---|
| 4,941,043 | * 7/1990 | Jass ..................................... | 375/240.2 |
| 5,461,655 | 10/1995 | Vuylsteke et al. ...................... | 378/62 |
| 5,512,956 | 4/1996 | Yan ........................................ | 348/606 |
| 5,565,921 | * 10/1996 | Sasaki et al. .......................... | 348/409 |
| 5,610,729 | 3/1997 | Nakajima .............................. | 358/463 |
| 5,629,778 | * 5/1997 | Reuman ................................ | 358/426 |
| 5,642,165 | * 6/1997 | Suzuki et al. ......................... | 348/404 |
| 5,802,218 | * 9/1998 | Brailean ............................... | 382/275 |
| 5,920,356 | * 7/1999 | Gupta et al. .......................... | 348/606 |
| 5,923,775 | * 7/1999 | Snyder et al. ........................ | 382/172 |
| 5,949,908 | * 9/1999 | Sugahara .............................. | 382/232 |
| 5,987,192 | * 11/1999 | Maltsev et al. ....................... | 382/298 |
| 6,018,597 | * 1/2000 | Maltsev et al. ...................... | 382/260 |
| 6,075,572 | * 6/2000 | Asami .................................. | 348/607 |

* cited by examiner

*Primary Examiner*—Vu Le
(74) *Attorney, Agent, or Firm*—Daniel W. Juffernbruch

(57) ABSTRACT

The present invention includes a device, article of manufacture, method, memory and computer-readable memory for removal of coding errors introduced through a compression process. The device includes an error control logic unit (404) that is coupled to receive decompressed pixel information of a video decoder and is used for detecting coding errors and a filter (418) that is coupled to the error control logic unit (404) and is used for preparing decompressed pixel information for display.

15 Claims, 4 Drawing Sheets

DEVICE, ARTICLE OF MANUFACTURE, METHOD, MEMORY, AND COMPUTER-READABLE MEMORY FOR REMOVING VIDEO CODING ERRORS

FIELD OF THE INVENTION

The present invention relates to removal of coding errors in a video communication system.

BACKGROUND OF THE INVENTION

Video compression standards such as H.261, H.263, MPEG-1 and MPEG-2 are based on a hybrid block motion compensated discrete cosine transform (DCT) encoding scheme. That is, temporal redundancy of a video sequence is removed by motion compensating the previous image frame and subtracting it from the present image frame, resulting in a temporal prediction error signal. The spatial redundancy of this prediction error signal is removed by the use of an invertible DCT, which converts the statistically dependent elements into independent coefficients, or equivalently compacts the energy into a small number of coefficients. The quantization of these coefficients results in a lossy compressed video sequence. Due to implementation considerations, both the motion compensation and the DCT are performed using blocks of data. Specifically, the motion compensation is implemented using a 16×16 block matching algorithm, while the DCT is applied to 8×8 blocks of the temporal error signal.

Although very high compression ratios are obtainable for video sequences using this technique, artifacts are introduced which severely degrade the visual quality of the decoded sequence. Therefore, some form of post-processing is required to remove these artifacts and improve the usefulness of the encoded video. The two types of artifacts typically encountered are motion and block boundary artifacts. These two types of artifacts are described below.

Motion artifacts (also called mosquito artifacts) are defined as temporally nonstationary impulses that appear around objects, which are moving within the decoded video sequence. These artifacts result from the coarse quantization of the prediction error signal. The majority of the energy contained in a prediction error signal is the result of the motion estimator's inability to distinguish between differently moving objects. For instance, in video-conferencing sequences the subject is generally against a stationary background. Since the motion estimator is a 16×16 block matcher, the boundary between the moving object and stationary background is not detected. This leads to a situation where either part of the background is assumed to be moving, or part of the moving object is assumed to be stationary. Coarsely quantizing these prediction errors results in impulsive artifacts that change over time and appear to swarm around the moving object.

Block boundary artifacts are defined as the introduction of artificial block boundaries into the decoded video sequence. These artifacts are due to the combination of dividing the prediction error signal into blocks, as well as quantization. Since each block is quantized separately, the errors are most visible at the block boundaries.

If left unaddressed, these artifacts greatly degrade a viewer's perceived quality of the encoded video sequence.

Users of compressed video demand that the decoder be also able to resize the video display window. This capability requires the decoder to perform an additional (with regards to removing coding artifacts) post-processing operation involving data interpolation or decimation. An important requirement is that this resize operation must be computationally efficient (i.e., real time) and produce a resized video sequence that is visually appealing. That is, artifacts should not be introduced into the video sequence as a result of the resizing operation. Furthermore, coding artifacts should not become more visible in the decoded sequence due to the resizing operation.

Prior art only addresses the problem of removing coding artifacts or noise. The problem of video resizing is not addressed. The prior art requires that two post-processing filters be used. The first post-processing filter is for artifact removal, while the second is required for window resizing. These filters would be implemented in series. That is, the output of the artifact removal filter is the input to the window resize filter.

Each of these approaches imposes substantial additional implementation complexity. For example, one approach taught by the prior art requires that an edge detector and additional spatial filter bank be implemented, while other approaches teach methods for reducing noise that require several additional operations such as a local variance calculation and activity calculation followed by a filter coefficient calculation and filtering. All of these methods specify implementations which require additional multipliers and summers. Implementing these methods is costly both in hardware, with additional silicon being required, and software, with additional instructions that must be executed.

In summary, the two post-processing operations; i.e., removing artifacts and resizing the decoded video are individually difficult to achieve under the constraint of real time operation. As a combined problem, the real time constraint is even more difficult to satisfy while also trying to keep the overall costs low.

The additional cost in implementing artifact removal filters result from:

A) the increase in the size of the IC (integrated circuit) die due to additional multipliers, adders and buffers required to implement an artifact removal filter;

B) a lower yield and therefore higher manufacturing costs due to the larger die;

C) the increased processing power (additional millions of instructions per second, MIPS) required to carry out the additional instructions that are necessary; and D) the additional bus-bandwidth required to move the pixel data between the artifact removal filtering unit and the frame buffer.

The consumer electronics market is a price-sensitive market that requires either a low cost video compression ASIC (application specific integrated circuit) or low cost embedded processor. The methods for artifact removal taught by prior art are too expensive to be included in such devices. Therefore, the prior art does not adequately address the needs of this and other price sensitive markets.

DETAILED DESCRIPTION OF A PREFERRED EMBODIMENT

Resizing the output video window or frame to the proper display format may require both interpolation and decimation. A linear filter with time-varying coefficients is used for interpolating/decimating by a factor of L/M. This is referred to as the resampling ratio M:L, i.e. for every M points input, L points are generated on the output. The general form of the convolution performed is given by:

$$y(m) = \sum_{n=-\infty}^{\infty} g_{m \oplus L}(n) x\left(\left\lfloor \frac{mM}{L} \right\rfloor - n\right)$$

$$g_m(n) = h(nL + mM \oplus L)$$

$$y(m) = \sum_{n=-\infty}^{\infty} g_{m \oplus L}(n) x\left(\left\lfloor \frac{mM}{L} \right\rfloor - n\right) \quad (1)$$

where, x, y=the input and output, respectively $g_m$=the set of time-varying filters M, L=the decimation and interpolation factors, respectively m⊕L=m modulo L $\left\lfloor \frac{mM}{L} \right\rfloor$ = the largest integer less than or equal to $\frac{mM}{L}$ Note that because of the periodicity introduced by the modulo arithmetic, there are L filters total.

The filters $g_m$ are derived from an overall filter h(n). For perfect resampling, h(n) is a sinc function (sin(x)/x). The filters are related to h(n) by:

$$g_m(n) = h(nL + mM \oplus L) \quad (2)$$

Therefore, the time-varying filters are merely sub-sampled versions of the overall filter. If the overall filter is used directly, the input is up-sampled by a factor of L (newly created points are set to zero), filtered by h(n), and then down-sampled by a factor of M. Since the direct method produces points that are discarded, using the $g_m$ filters reduces total computation. The $g_m$ filters are also called polyphase filters because the sub-sampling and subsequent realignment of the filter coefficients introduces a different phase shift for each of the filters.

The polyphase filters described above are a standard or "original" approach to resizing a video window. The present invention utilizes the hardware necessary to implement these original filters to also remove blocking and coding artifacts. That is, a second set of polyphase filter coefficients are used for resizing the video window when artifacts are present. These artifact removal coefficients are stored in Read Only Memory (ROM) with the original coefficients and used when artifacts are present.

Figure 1:
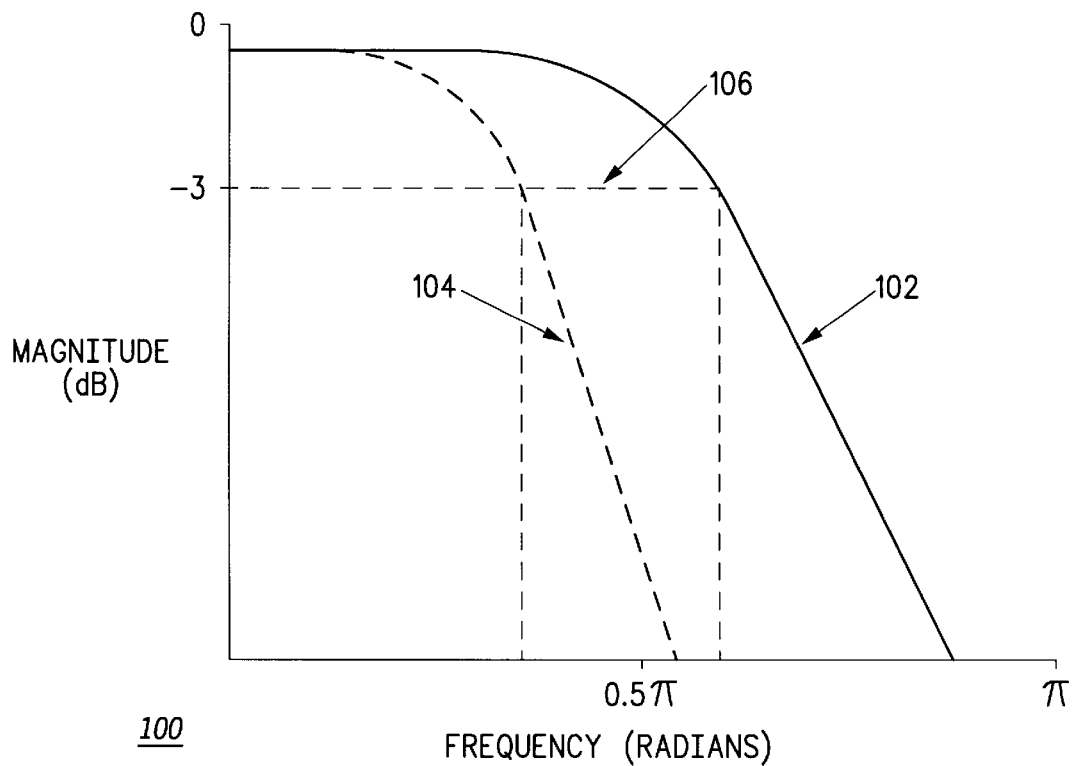
FIG. 1 is a graphical representation of the passbands associated with two different sets of filter coefficients utilized by a single resizing filter to remove blocking and coding artifacts in accordance with the present invention.

To remove mosquito and blocking artifacts, a second set of polyphase filters is created. These filters are referred to as artifact removal filters. They are designed in a very similar manner as the original filters. However, the cutoff frequency is set to approximately 67% of the original resampling filter. FIG. 1, numeral 100, is a graphical representation of an example of two passbands associated with different filter coefficients utilized by a single resizing filter in order to both resize a video window and remove blocking and coding artifacts in accordance with the present invention.

In FIG. 1, an example of the relationship between the passbands of the original (102) and artifact removal filters (104) is provided. With its reduced passband, the artifact removal filter (104) results in additional smoothing at the location of an artifact. By providing this additional smoothing, the ability of the viewer to distinguish the artifact is reduced. This results in decoded video with a higher perceived visual quality. In FIG. 1, the 3 dB cutoff point (106), which indicates a filter's cutoff frequency, of the artifact removal filter is shown to be approximately 67% of the original resampling filter. This relationship between the two filters can be altered depending on the severity of the coding and blocking artifacts and the amount of smoothing that can be tolerated by a particular application.

Figure 2:
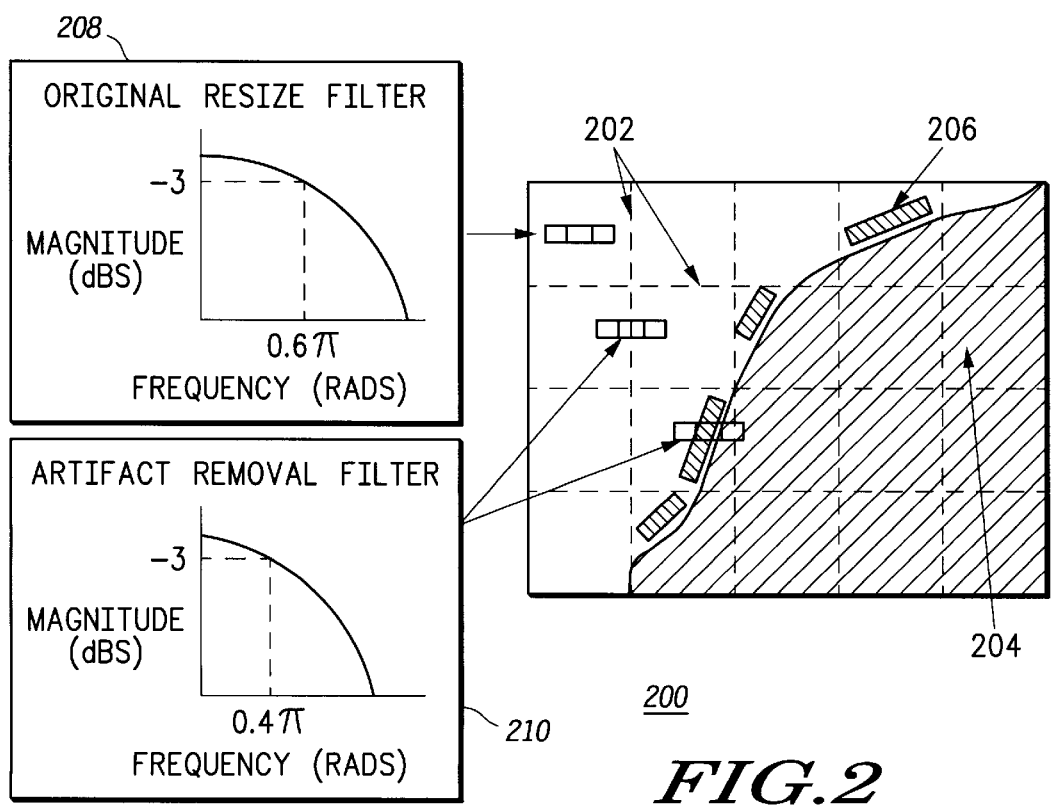
FIG. 2 is an illustration of how to switch between two sets of filter coefficients in order to remove blocking and coding artifacts in accordance with the present invention.

FIG. 2, numeral 200, is an illustration of how different filter coefficients are utilized by the same filter bank in order both to resize a video window and remove blocking and coding artifacts in accordance with the present invention. For the resizing operation, the original resampling filter (208) is utilized throughout much of the resizing process. Exceptions occur at both the block boundaries (202) and at locations which are determined to contain coding artifacts (206). One major difference between blocking (202) and coding (206) artifacts is the fact that the location of a blocking artifact (202) is known a priori. Therefore, as shown in FIG. 2, the coefficients corresponding to the artifact removal filter (210) are utilized for resampling at known block boundaries (202). Since coding artifacts (206) are caused by moving objects (204), their presence at a particular location must be detected. The invention provides this capability for detecting a coding artifact (206). Once a coding artifact (206) is detected, the artifact removal coefficients (210) are again utilized for resizing the video window.

The present invention provides a very cost effective solution to the problem of removing blocking and coding artifacts from a coded video sequence. This invention adaptively selects between two sets of predetermined filter coefficients. The first set of filter coefficients corresponds to the resizing filter (208) with a cutoff frequency (106) that is consistent with the resampling ratio (L/M). The second set of filter coefficients corresponds to the artifact removal filter (210). These coefficients result in a filter passband that provides additional smoothing of the intensity values in locations where either blocking (202) or coding (206) artifacts are determined to exist.

Figure 3:
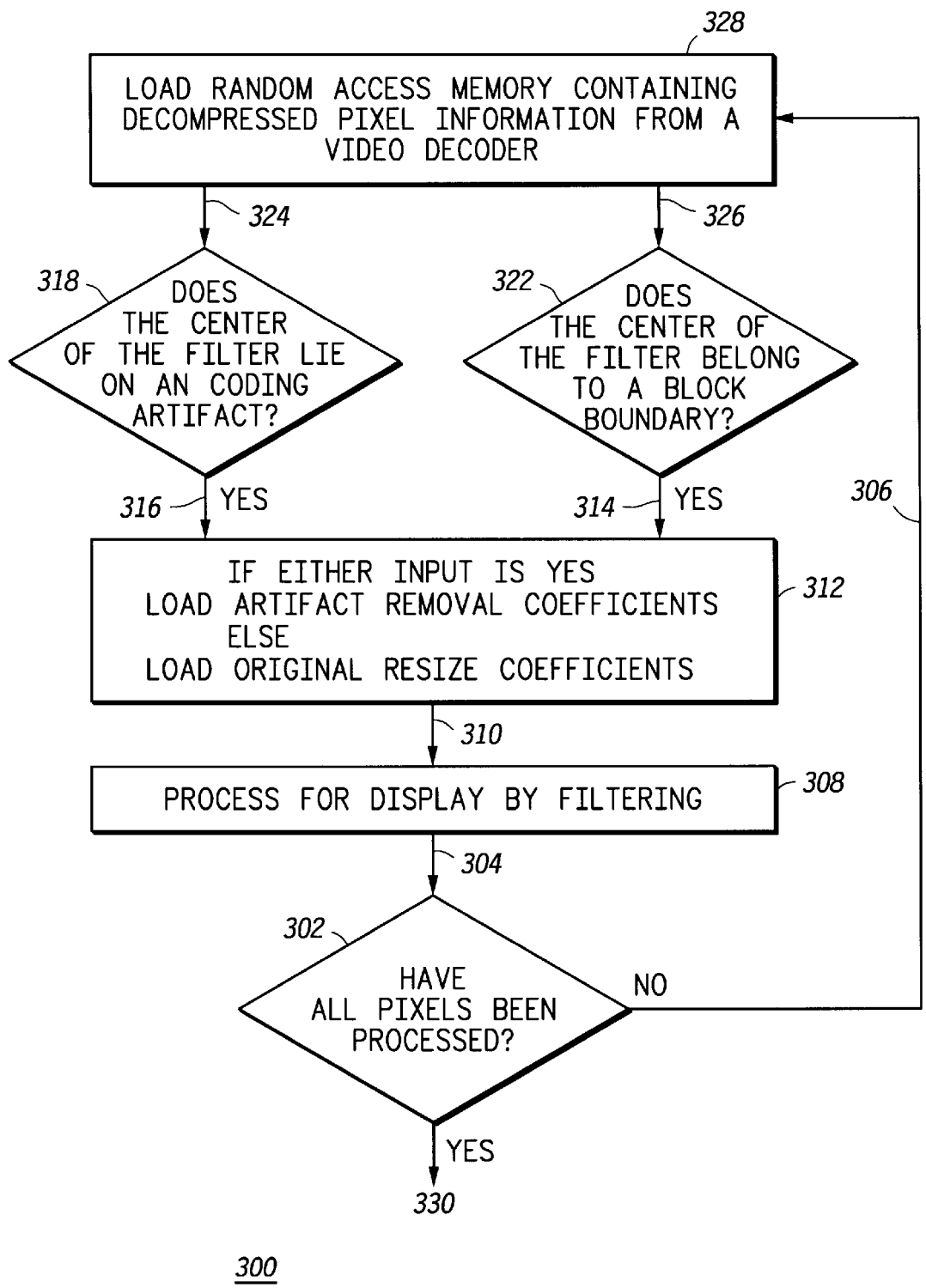
FIG. 3 is a flow chart of one embodiment of the steps implemented by a post-processing filter which both resizes the video window and suppresses coding and blocking artifacts in accordance with the present invention.

FIG. 3, numeral 300, is a flow chart of one embodiment of the steps implemented by a post-processing filter which both resizes the video window and suppresses coding and blocking artifacts in accordance with the present invention. The first step consists of loading local Random Access Memory (RAM) with decompressed pixel information from a video decoder (328). The size of this memory is consistent with the memory required to implement a resizing filter of a particular number of taps (where a tap is an intermediate point in an electric circuit where a connection may be made). This is followed by a decision operation (326) that determines whether the center of the filter is on a block boundary or not. The decision criteria for determining whether the center of the filter is on a block boundary or not is given by:

If (i modulo8=0 or i modulo8=7), (3)

where i is either the row or column location of a particular pixel under consideration. The modulo8 operation returns the remainder of i divided by 8. If the remainder is 0, then the pixel location is a multiple of 8 and therefore on the right side of the boundary. If the remainder is 7, then the pixel location is on the left side of the boundary. For clarity of presentation, it is assumed that the video frame is processed in two one-dimensional steps. That is, the operations described in the present invention are performed first on the rows of pixels followed by the columns. This assumption however, does not restrict this invention from being implemented first on the columns then the rows or simultaneously on both the rows and columns.

In parallel (324), a second decision operation is performed (318) to determine whether the center of the filter lies on a coding artifact or not. The decision criteria for determining whether the center of the filter is on a block boundary or not is given by:

if((|x(i−1)−x(i+1)|<T) AND (|x(i)−x(i+1)|<B)), (4)

where again i is either the row or column location of the particular pixel under consideration and T and B are predetermined thresholds used to control the amount of smoothing applied to the decoded video sequence. Typically, T is a value that can range between 0 (off) and 7, and B is fixed to a value between 10 and 16.

If either one or both of the two criteria ((318) or (322)) is satisfied, i.e., the output is "Yes", then the resize filter (308) is loaded (312) with the artifact removal coefficients for the artifact removal filter. If neither criterion is meet, i.e., the decision is "No" for both (318) and (322), then the resize filter (308) is loaded with the original resize coefficients (312). These same operations are repeated (306) until it is determined (302) that the entire video frame has been processed (330).

It should be noted that these two decision rules could also be implemented in series. That is, the block boundary test (322) could easily be implemented first, followed by the coding artifact test (318). The reverse could also be implemented, the coding artifact test (318) followed by the block boundary test (322). Either of the above implementation schemes would be equally effective.

Figure 4:
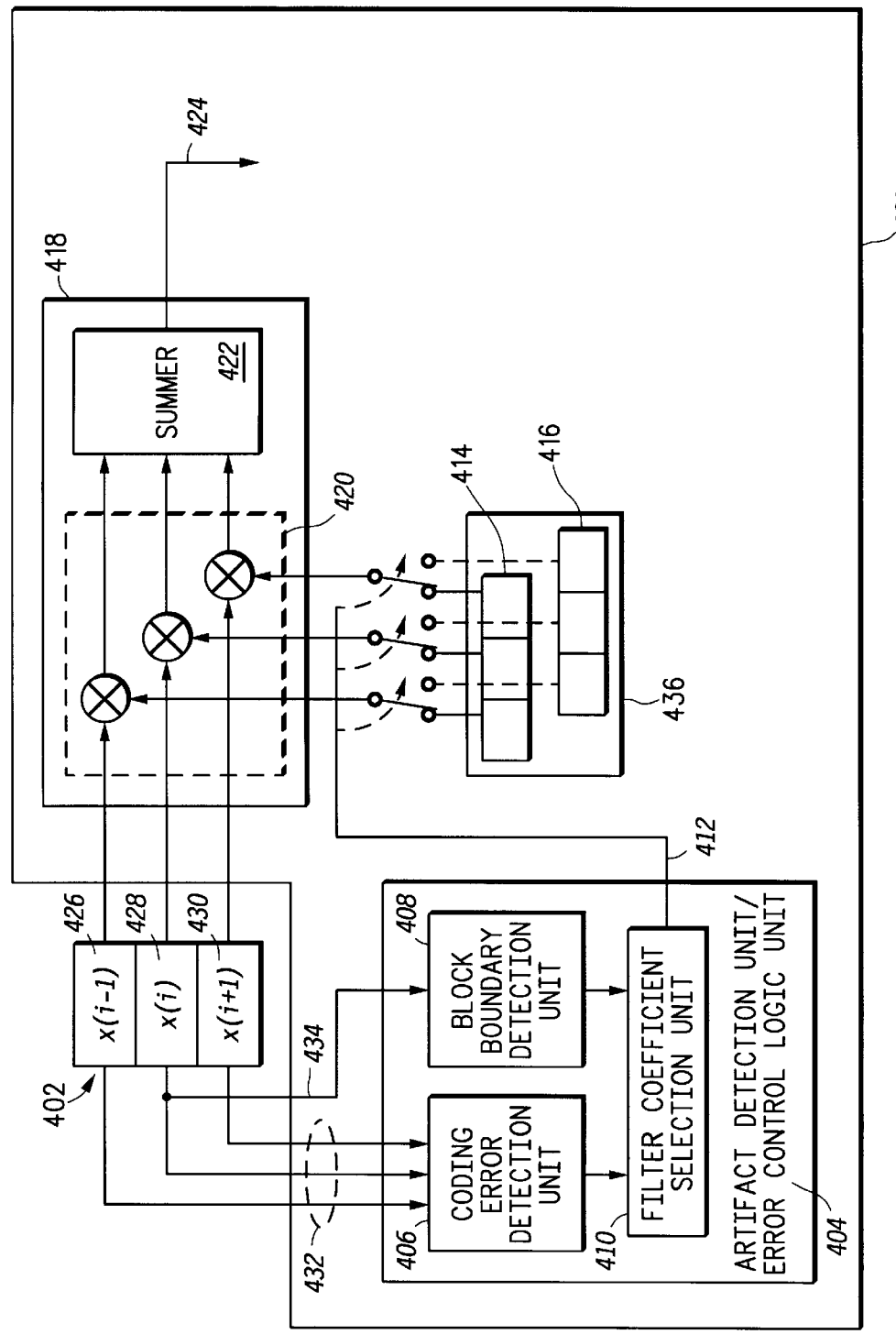
FIG. 4 is a block diagram of one embodiment of a post-processing filter that both resizes the video window and suppresses coding and blocking artifacts in accordance with the present invention.

FIG. 4, numeral 400, is a block diagram of a post-processing filter that both resizes the video window and suppresses coding and blocking artifacts in accordance with the present invention. To simplify this example, the block diagram of the resize filter is shown to have three taps. Clearly, the number of taps may be varied. The three corresponding input pixels (426, 428, 430) are stored locally in RAM (402). These values are used as input (432 and 434) to a coding error detection unit (406) and a block boundary detection unit (408) of the artifact detection unit (404). The artifact detection unit (404) includes the coding error detection unit (406), the block boundary detection unit (408) and a filter coefficient selection unit (410) coupled to the coding error detection unit (406) and the block boundary detection unit (408). As is clear from FIG. 4, input to the block boundary detection unit (408) typically excludes the first and input pixel values. Based on the output of the coding error detection unit (406) and the block boundary detection unit (408), the filter coefficient selection unit (410) selects (412) which filter coefficients (436) are to be used to filter the current pixel location (428). The filter coefficient selection unit (410) selects between the original resize filter coefficients (414) and the artifact removal filter coefficients (416), which are typically stored in a ROM (436). The post-processing filter (418) includes a bank of multipliers or taps (420) and a summer (422). Each input pixel (426, 428, 430) is multiplied (420) by a filter coefficient (436) and summed together (422) resulting in the post-processed pixel output (424).

Figure 5:
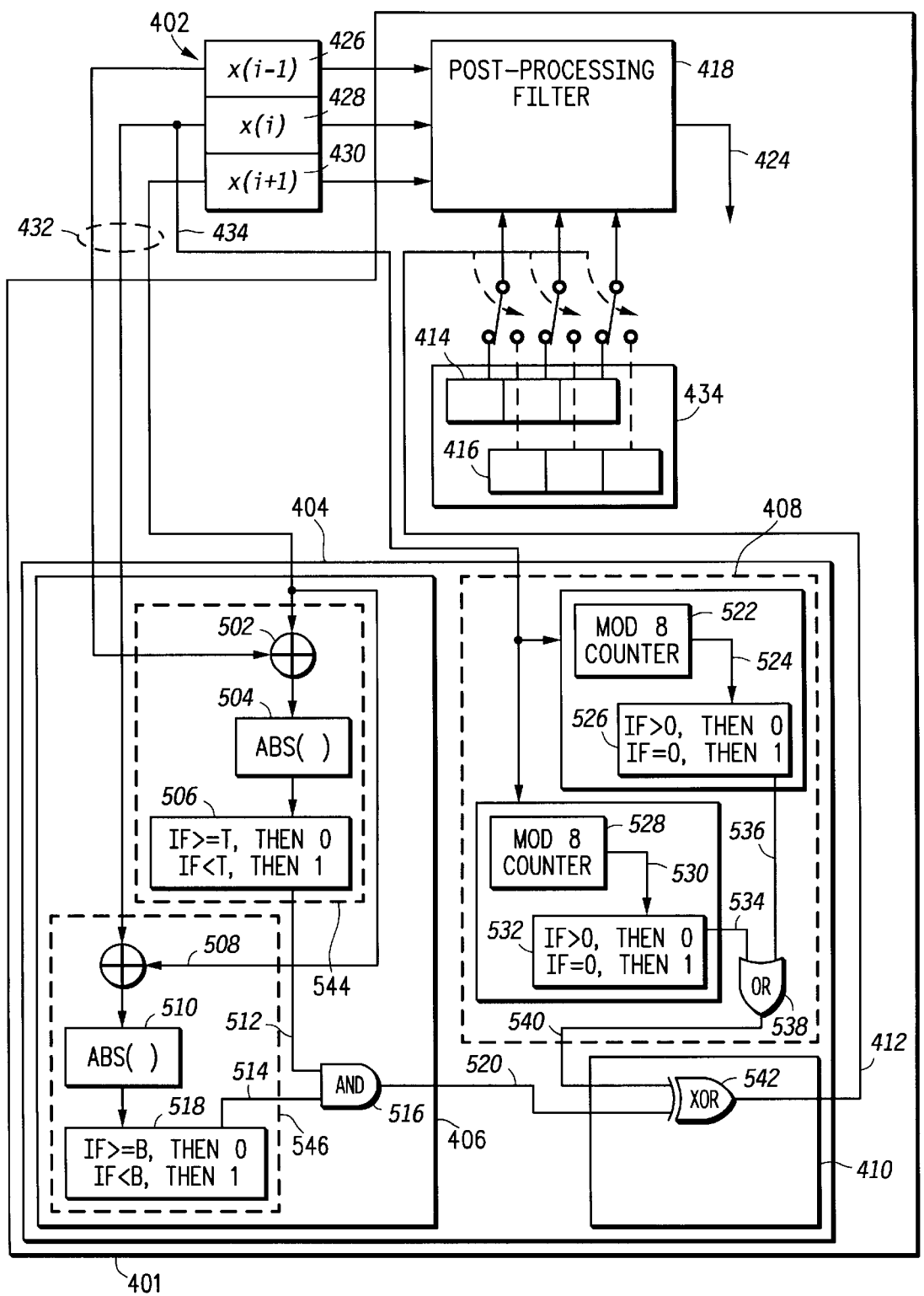
FIG. 5 is a block diagram of the post-processing filter of FIG. 4 shown with greater particularity.

FIG. 5, numeral 500, is a block diagram of one embodiment of a post-processing filter which both resizes the video window and suppresses coding and blocking artifacts in accordance with the present invention. Counting quantization is used to determine whether the pixel information is associated with a block boundary. The artifact detection unit (404) includes a coding error detection unit (406), a block boundary detection unit (408) and a filter coefficient selection unit (410). The coding error detection unit (406) includes two comparitor units (Comparitor Unit #1, 544; Comparitor Unit #2, 546) coupled to an AND logic circuit (516). The first comparitor (544) includes an adder (502), absolute value circuit (504) and a thresholder (506). The inputs to the first comparitor (544) are pixel x(i−1) (428) and x(i+1) (430). The absolute value (504) of the difference (502) (as described above in Eq. (4)) of the x(i−1) and x(i+1) signals is compared (506) to a predetermined threshold T.

The second comparitor (546) comprises an adder (508), absolute value circuit (510) and a thresholder (518). The inputs to the second comparitor (546) are pixels x(i) and x(i+1). The absolute value (510) of the difference (508) (described above in Eq. (4)) of the x(i) and x(i+1) signals is compared (518) to a predetermined threshold B. The output of the second comparitor (514) is input to a logical AND circuit (516) together with the output of the first comparitor (512) to provide an output (520) for the coding error detection unit (406) to determine whether a coding artifact is present or not.

The Block Boundary Detection Unit (408) includes two modulo 8 calculators (522 and 528), each coupled to a thresholding unit (526 and 532, respectively) and the outputs of each of the two thresholding units (526, 532) are input to an OR logic circuit (538). The position, i, of the center pixel (428) is input to both of the modulo 8 calculators (522 and 528). The modulo 8 value (i.e., the remainder of i/8) calculated by the modulo 8 calculators (522 and 528) is passed (524 and 530) to the corresponding thresholding unit (526, 532). If either thresholding unit (526, 532) outputs a value 1, then the pixel is determined to be on a block boundary.

The outputs (520,540) of both the coding error detection unit (412) and the block boundary detection unit (408) are provided as inputs to the filter coefficient selection circuit (410). The filter coefficient selection circuit (410) includes an exclusive logic circuit (XOR, 542). If either input (520, 540) has a value 1, indicating a coding error or block boundary is present, then the filter coefficient selection circuit output (412) is set to 1. When the output of the filter coefficient selection circuit (412) is set to 1, the artifact removal filter coefficients (416) are selected. Otherwise, when the output of the filter coefficient selection circuit (412) is set to 0, the original resize filter coefficients (414) are selected.

Thus, the present invention may be implemented as a device (401) for removal of coding errors introduced through a compression process, where the device includes an error control logic unit (404) coupled to a filter (418). The error control logic unit (404) is coupled to receive decompressed pixel information of a video decoder and is utilized for providing an output indicating whether coding errors are detected (as described more fully above). The filter (418), typically called a post-processing filter, is coupled to the error control logic unit (404), and is used for preparing decompressed pixel information for display based on the error control logic unit output (see description above). The coding errors may include block boundary errors, and further may include quantization errors.

In a preferred embodiment, the error control logic unit (404) is coupled to receive the decompressed pixel information of the video decoder, for performing counting quantization for determining whether the pixel information is associated with a block boundary, and: A) where the pixel information is associated with the block boundary, correcting for the block boundary and processing for display; and B) where the pixel information fails to be associated with the block boundary, B1) determining whether coding errors are present, and: B1a) where coding errors are present, correcting the coding errors and processing for display, and B1b) where coding errors fail to be present, processing for display.

Typically, the device (401) may be incorporated into one of: A) a set-top box; B) a digital versatile disk; C) a video conference unit; D) a wireless personal digital assistant; E) a surveillance camera; F) an application specific integrated circuit; and G) a field programmable gate array.

Further, the present invention may be implemented by an article of manufacture for removal of coding errors introduced through a compression process, wherein the article of manufacture is a computer usable medium having computer readable program code thereon. The article of manufacture (401) may be a computer usable medium (such as a computer disk) that includes an error control logic unit (404) coupled to a (post-processing) filter (418), wherein the error control logic unit (404) and the (post-processing) filter (418) are implemented in the computer readable program code that is stored on the computer usable medium. The article of manufacture may also be a set-top box, a digital versatile disk (DVD), a video conference unit, a wireless personal digital assistant (PDA), a surveillance camera, an application specific integrated circuit (ASIC), or a field programmable gate array (FPGA) which is configured to implement the present invention.

In another preferred embodiment the present invention may be a memory having stored thereon instructions and data which, when loaded into a microprocessor, causes the microprocessor to implement removal of coding errors introduced through a compression process. The instructions include error control logic instructions, coupled to receive decompressed pixel information input of a video decoder, that are used for detecting coding errors. Where coding errors are detected, the instructions provide an output to filtering instructions and the filtering instructions prepare decompressed pixel information for display. As before, the coding errors may include block boundary errors, and may further include quantization errors. The error control logic instruction generally perform counting-quantization to determine whether the pixel information is associated with a block boundary, and: A) where the pixel information is associated with the block boundary, corrects for the block boundary and processes for display; and B)where the pixel information fails to be associated with the block boundary, B1) determines whether coding errors are present, and: B1a) where coding errors are present, corrects the coding errors and processing for display, and B1b) where coding errors fail to be present, processes for display.

The invention may also be embodied as a computer-readable memory for removing coding errors introduced through a compression process, having computer readable program code thereon. The computer-readable memory includes: A) error control logic computer readable program code, coupled to receive input of decompressed pixel information of a video decoder, which detect coding errors, and where coding errors are detected, for provide an output to a filtering computer readable program code; and B) the filtering computer readable program code prepares decompressed pixel information for display. Clearly, instructions on the computer-readable memory operate as described more fully above.

In one embodiment, the method of the present invention removal of coding errors introduced through a compression process, includes the steps of: A) utilizing an error control logic unit for detecting coding errors of decompressed pixel information of a video decoder, and where coding errors are detected, providing an output to a filter; and B) utilizing a filter for using the output to prepare decompressed pixel information for display. The coding errors may include at least one of: block boundary errors, and may further include quantization errors. Utilizing an error control logic unit for detecting coding errors of decompressed pixel information of a video decoder, and where coding errors are detected, providing an output to a filter generally includes determining whether the pixel information is associated with a block boundary, and: A) where the pixel information is associated with the block boundary, correcting for the block boundary and processing for display; and B) where the pixel information fails to be associated with the block boundary, B1) determining whether coding errors are present, and: B1a) where coding errors are present, correcting the coding errors and processing for display, and B1b) where coding errors fail to be present, processing for display. The method is typically implemented by a set-top box, a digital versatile disk, a video conference unit, a wireless personal digital assistant, a surveillance camera, an application specific integrated circuit, or a field programmable gate array.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

We claim:

1. A device for resizing decompressed pixel information and removal of coding errors introduced through a compression process, comprising:

an error control logic unit, coupled to receive decompressed pixel information of a video decoder, for detecting coding errors and providing an error condition signal;

a memory register for storing a plurality of predetermined sets of filter coefficients, wherein one of the predetermined sets of filter coefficients is associated with an error-free condition and wherein at least one other predetermined set of filter coefficients corresponds to an error condition;

a switch coupled to receive a control signal from the error control logic unit and coupled to the memory to select one of the predetermined sets of filter coefficients based on the error condition signal and provide a selected predetermined set of filter coefficients; and a filter, coupled to the switch to receive the selected predetermined set of filter coefficients and coupled to receive the decompressed pixel information to resize the decompressed pixel information for display based upon the selected predetermined set of filter coefficients.

2. The device of claim 1 wherein the coding errors include block boundary errors.

3. The device of claim 2 wherein the coding errors further include quantization errors.

4. The device of claim 1 wherein the error control logic unit includes a counting-quantization unit, coupled to receive the decompressed pixel information of the video decoder, for performing counting-quantization to determine whether the pixel information is associated with a block boundary, and:
   A) where the pixel information is associated with the block boundary, correcting for the block boundary and processing for display; and
   B) where the pixel information fails to be associated with the block boundary,
      B1) determining whether coding errors are present, and:
         B1a) where coding errors are present, correcting the coding errors and processing for display, and
         B1b) where coding errors fail to be present, processing for display.

5. The device of claim 1 wherein the device is incorporated into one of:
   A) a set-top box;
   B) a digital versatile disk;
   C) a video conference unit;
   D) a wireless personal digital assistant;
   E) a surveillance camera;
   F) an application specific integrated circuit; and
   G) a field programmable gate array.

6. An article of manufacture for resizing decompressed pixel information and for removal of coding errors introduced through a compression process, comprising a computer usable medium having computer readable program code thereon comprising:
   an error control logic unit, coupled to receive decompressed pixel information of a video decoder, for detecting coding errors and providing an error condition signal;
   a memory register for storing a plurality of predetermined sets of filter coefficients, wherein one of the predetermined sets of filter coefficients is associated with an error-free condition and wherein at least one other predetermined set of filter coefficients corresponds to an error condition;
   a switch coupled to receive a control signal from the error control logic unit and coupled to the memory to select one of the predetermined sets of filter coefficients based on the error condition signal and provide a selected predetermined set of filter coefficients; and
   a filter, coupled to the switch to receive the selected predetermined set of filter coefficients and coupled to receive the decompressed pixel information, for resizing the decompressed pixel information for display based upon the selected predetermined set of filter coefficients.

7. The article of manufacture of claim 6 wherein the coding errors include block boundary errors.

8. The article of manufacture of claim 7 wherein the coding errors further include quantization errors.

9. The article of manufacture of claim 6 wherein the error control logic unit, coupled to receive the decompressed pixel information of the video decoder, uses counting quantization for determining whether the pixel information is associated with a block boundary, and:
   A) where the pixel information is associated with the block boundary, correcting for the block boundary and processing for display; and
   B) where the pixel information fails to be associated with the block boundary,
      B1) determining whether coding errors are present, and:
         B1a) where coding errors are present, correcting the coding errors and processing for display, and
         B1b) where coding errors fail to be present, processing for display.

10. The article of manufacture of claim 6 wherein the article of manufacture is one of:
    A) a set-top box;
    B) a digital versatile disk;
    C) a video conference unit;
    D) a wireless personal digital assistant;
    E) a surveillance camera;
    F) an application specific integrated circuit; and
    G) a field programmable gate array.

11. A method for resizing decompressed pixel information and for removal of coding errors introduced through a compression process, comprising the steps of:
    A) detecting coding errors of decompressed pixel information of a video decoder and providing an error condition signal,
    B) selecting one of a plurality of predetermined sets of filter coefficients based on the error condition signal, wherein one of the predetermined sets of filter coefficients is associated with an error-free condition and wherein at least one other predetermined set of filter coefficients corresponds to an error condition, and
    C) resizing the decompressed pixel information for display based upon the selected one of the plurality of predetermined set of filter coefficients.

12. The method of claim 11 wherein the coding errors include at least one of: block boundary errors.

13. The method of claim 12 wherein the coding errors further include quantization errors.

14. The method of claim 11 wherein the step of detecting coding errors of decompressed pixel information of a video decoder and providing an error condition signal includes the step of, where coding errors are detected, determining whether the pixel information is associated with a block boundary, and:
    A) where the pixel information is associated with the block boundary, correcting for the block boundary and processing for display; and
    B) where the pixel information fails to be associated with the block boundary,
       B1) determining whether coding errors are present, and:
          B1a) where coding errors are present, correcting the coding errors and processing for display, and
          B1b) where coding errors fail to be present, processing for display.

15. The method of claim 11 wherein the method is implemented by one of:
    A) a set-top box;
    B) a digital versatile disk;
    C) a video conference unit;
    D) a wireless personal digital assistant;
    E) a surveillance camera;
    F) an application specific integrated circuit; and
    G) a field programmable gate array.

* * * * *